United States Patent
Milyakov

(10) Patent No.: US 9,319,365 B1
(45) Date of Patent: Apr. 19, 2016

(54) SYSTEMS AND METHODS FOR STORING AND TRANSFERRING MESSAGE DATA

(71) Applicant: Machine Zone, Inc., Palo Alto, CA (US)

(72) Inventor: Igor Milyakov, Sunnyvale, CA (US)

(73) Assignee: Machine Zone, Inc., Palo Alto, CA (US)

( * ) Notice: Subject to any disclaimer, the term of this patent is extended or adjusted under 35 U.S.C. 154(b) by 0 days.

(21) Appl. No.: 14/879,689

(22) Filed: Oct. 9, 2015

(51) Int. Cl.
| G06F 15/173 | (2006.01) |
| H04L 12/58 | (2006.01) |
| H04L 29/06 | (2006.01) |
| G06F 12/08 | (2006.01) |
| H04L 29/08 | (2006.01) |

(52) U.S. Cl.
CPC ............ H04L 51/16 (2013.01); G06F 12/0866 (2013.01); H04L 29/06 (2013.01); H04L 29/08072 (2013.01); H04L 51/32 (2013.01)

(58) Field of Classification Search
CPC .............. H04L 29/06; H04L 29/08072; G06F 12/0866
USPC .............. 709/203, 218, 232; 711/136; 703/26
See application file for complete search history.

(56) References Cited

U.S. PATENT DOCUMENTS

| 4,264,924 | A | 4/1981 | Freeman |
| 5,706,331 | A | 1/1998 | Wang et al. |
| 6,549,959 | B1 * | 4/2003 | Yates .................. G06F 9/45554 710/1 |
| 7,047,394 | B1 * | 5/2006 | Van Dyke ........... G06F 9/30167 703/26 |
| 7,065,633 | B1 * | 6/2006 | Yates, Jr. ............. G06F 9/30167 712/227 |
| 7,376,092 | B2 | 5/2008 | Yajnik et al. |
| 7,668,908 | B2 | 2/2010 | Kakivaya et al. |
| 7,676,580 | B2 | 3/2010 | Hill et al. |
| 7,929,562 | B2 | 4/2011 | Petrovykh |
| 7,941,448 | B2 | 5/2011 | Eslambolchi et al. |
| 7,970,918 | B2 | 6/2011 | Thompson et al. |
| 8,065,504 | B2 * | 11/2011 | Yates, Jr. ............. G06F 9/45533 703/26 |

(Continued)

OTHER PUBLICATIONS

Cloud Pub/Sub, accessed on the internet at: https://cloud.google.com/pubsub/overview; downloaded Aug. 7, 2015; 5pgs.

(Continued)

*Primary Examiner* — Khanh Dinh
(74) *Attorney, Agent, or Firm* — Goodwin Procter LLP

(57) ABSTRACT

Methods, systems, and apparatus, including computer programs encoded on a computer storage medium, for storing and transferring messages. An example method includes providing a queue having an ordered plurality of storage blocks. Each storage block stores one or more respective messages and is associated with a respective time. The times increase from a block designating a head of the queue to a block designating a tail of the queue. The method also includes reading, by each of a plurality of first sender processes, messages from one or more blocks in the queue beginning at the head of the queue. The read messages are sent, by each of the plurality of first sender processes, to a respective recipient. One or more of the blocks are designated as old when they have associated times that are earlier than a first time. A block is designated as a new head of the queue when the block is associated with a time later than or equal to the first time. One or more of the first sender processes is allowed to read messages from the old blocks until a second time which is later than the first time. One or more of the old blocks are deleted at a time later than or equal to the second time.

29 Claims, 8 Drawing Sheets

(56) References Cited

U.S. PATENT DOCUMENTS

| | | | |
|---|---|---|---|
| 8,074,055 B1 * | 12/2011 | Yates, Jr. | G06F 9/3005 712/209 |
| 8,086,672 B2 | 12/2011 | Horvitz | |
| 8,121,828 B2 * | 2/2012 | Yates, Jr. | G06F 9/45533 703/26 |
| 8,375,095 B2 | 2/2013 | Yurkovich et al. | |
| 8,429,702 B2 | 4/2013 | Yasrebi et al. | |
| 8,489,674 B2 | 7/2013 | Srivastava et al. | |
| 8,539,359 B2 | 9/2013 | Rapaport et al. | |
| 8,799,213 B2 | 8/2014 | Wong et al. | |
| 8,850,015 B2 | 9/2014 | Finn | |
| 8,856,202 B2 | 10/2014 | McCabe et al. | |
| 8,898,293 B2 | 11/2014 | Raleigh et al. | |
| 8,965,409 B2 | 2/2015 | Abhyanker | |
| 2002/0016851 A1 | 2/2002 | Border | |
| 2004/0139166 A1 | 7/2004 | Collison | |
| 2005/0021622 A1 | 1/2005 | Cullen | |
| 2007/0013948 A1 | 1/2007 | Bevan | |
| 2008/0016198 A1 | 1/2008 | Johnston-Watt et al. | |
| 2008/0235366 A1 | 9/2008 | Telfer | |
| 2011/0179162 A1 | 7/2011 | Mayo | |
| 2013/0031162 A1 | 1/2013 | Willis et al. | |
| 2013/0159472 A1 | 6/2013 | Newton et al. | |
| 2013/0254314 A1 | 9/2013 | Chow | |
| 2014/0237057 A1 | 8/2014 | Khodorenko | |
| 2014/0372489 A1 | 12/2014 | Jaiswal et al. | |
| 2015/0012598 A1 | 1/2015 | Klimt | |
| 2015/0100664 A1 | 4/2015 | Flack et al. | |
| 2015/0207851 A1 | 7/2015 | Nampally | |

OTHER PUBLICATIONS

Welcome to PyPubSub's Home Page!, accessed on the internet at: http://pubsub.sourceforge.net/; downloaded Aug. 7, 2015; 2pgs.

Publish—subscribe pattern; accessed on the internet at: https://en.wikipedia.org/wiki/Publish%E2%80%93subscribe_pattern; downloaded Aug. 7, 2015; 4pgs.

Zeidler, et al., "Mobility Support with REBECA," Proc. 23rd Int'l Conference on Distributed Computing Systems Workshops; May 19-22, 2003; 5pgs.

U.S. Appl. No. 14/821,416, Aug. 7, 2015, Scalable, Real-Time Messaging System, Walkin, et al.

U.S. Appl. No. 14/821,421, Aug. 7, 2015, Scalable, Real-Time Messaging System, Walkin, et al.

U.S. Appl. No. 14/879,661, Oct. 9, 2015, Systems and Methods for Storing and Transferring Message Data, Hafri.

U.S. Appl. No. 14/885,034, Oct. 16, 2015, Systems and Methods for Transferring Message Data, Kushnir, et al.

Corsaro et al., "Quality of Service in Publish/Subscribe Middleware," IOS Press, 2003 (19 pages).

Vahdat et al., "Epidemic Routing for Partially-Connected Ad Hoc Networks," Duke University, 2000 (14 pages), available at: http://citeseerx.ist.psu.edu/viewdoc/summary?doi=10.1.1.34.6151.

* cited by examiner

SYSTEMS AND METHODS FOR STORING AND TRANSFERRING MESSAGE DATA

BACKGROUND

This specification relates to a data communication system and, in particular, a system that implements real-time, scalable publish-subscribe messaging.

The publish-subscribe pattern (or "PubSub") is a data communication messaging arrangement implemented by software systems where so-called publishers publish messages to topics and so-called subscribers receive the messages pertaining to particular topics that are subscribed to. There can be one or more publishers per topic and publishers generally have no knowledge of what subscribers, if any, will receive the published messages. Some PubSub systems do not cache messages or have small caches meaning that subscribers may not receive messages that were published before the time of subscription to a particular topic. PubSub systems can be susceptible to performance instability during surges of message publications or as the number of subscribers to a particular topic increases.

SUMMARY

In general, there are two ways of dispatching messages in a PubSub system. One way is to give the publisher information about the subscribers and make the publisher responsible for delivery of every message to every recipient. This method has serious problems with scaling, since there is a linear (e.g., O(N)) dependency of work to be done for a single message delivery, based on the number of subscribers N. A second approach is to store everything in a common storage (e.g., using ERLANG ETS) and let every consumer or subscriber retrieve messages from the common storage independently. In this case, there is no direct O(N) dependency for a publisher, but a separate notification system is used to inform the consumers about new messages. This second method also uses many mutually exclusive locks to ensure modifications of the common storage are safe across all of the users.

In certain examples, the systems and methods described herein are a variation of the second approach and incorporate multiple optimization. The systems and methods preferably have no mutexes (e.g., compare and swap operations) in a data manipulation section, so there are no locks that require a publisher or subscriber to wait for another party. In general, each operation is processed independently with respect to inter-core cache coherency. The data is preferably read by blocks of about 64 kB, which provides faster performance over the first approach, described above. In some instances, there is an additional optimization for subscriber cooperation, which prevents frequently published channels from dominating over infrequently published channels. The systems and methods may also use an optimized notification mechanism with channel speed specific approaches that keep latencies low, in channels of any speed.

Compared to previous approaches, the systems and methods described herein have many benefits. For example, there is little or no visible dependency between publisher performance and number of subscribers. Also, data is advantageously aggregated and delivered in chunks, which reduces handling overhead. Chunk size may be dynamic to keep latencies low, and there are preferably no locks between publisher and subscriber and between subscribers. The notification mechanism also has channel speed specific algorithms that provide a better balance between latencies and CPU utilization. Further, the systems and methods have automatic memory utilization logic that frees memory according to requirements, with no locks involved. In one test, a prior approach, based on the second method described above, delivered up to 5 million 100-byte messages per second on a single physical server, while the improved systems and methods described herein delivered 830 million 100-byte messages per second, with the same single physical server.

In general, one aspect of the subject matter described in this specification relates to a method. The method includes performing, by one or more computers, the following steps: providing a queue comprising an ordered plurality of storage blocks, each storage block storing one or more respective messages and being associated with a respective time, wherein the times increase from a block designating a head of the queue to a block designating a tail of the queue; reading, by each of a plurality of first sender processes, messages from one or more blocks in the queue beginning at the head of the queue; sending, by each of the plurality of first sender processes, the read messages to a respective recipient; designating as old one or more of the blocks having associated times that are earlier than a first time; designating a block associated with a time later than or equal to the first time as a new head of the queue; allowing one or more of the first sender processes to read messages from the old blocks until a second time which is later than the first time; and deleting from the queue one or more of the old blocks at a time later than or equal to the second time.

In certain examples, the method also includes determining that there are one or more messages to be read in the queue for one or more second sender processes and, based thereon, waking the second sender processes. Determining that there are one or more messages to be read in the queue for one or more second sender processes may include: for one or more publisher processes, determining if the publisher process has inserted a new message into the queue since a previous time; and identifying the second sender processes as processes that have not read one of the new messages from the queue. The one or more second processes may include at least one multiple queue publisher.

In some examples, the queue is for messages of a single channel, and each of the recipients has subscribed to the channel. The queue may be for messages from a single publisher. A particular recipient may be an MX node or a Q node. In some implementations, the method includes inserting, by one or more publisher processes, one or more messages into the block designating the tail of the queue. A particular publisher process may be an MX node, a Q node, or a multiple queue publisher.

The method may also include putting one or more first sender processes that have no more messages to read in the queue to sleep. The queue may include or be a channel queue. The one or more first sender processes may include at least one subscriber or multiple queue consumer. In various examples, the queue is for messages from at least one of a publisher and a multiple queue publisher. Designating one or more of the blocks as old may be done during the reading.

In another aspect, the subject matter of this disclosure relates to a system that includes a non-transitory computer readable medium having instructions stored thereon. The system also includes a data processing apparatus configured to execute the instructions to perform operations that include: providing a queue comprising an ordered plurality of storage blocks, each storage block storing one or more respective messages and being associated with a respective time, wherein the times increase from a block designating a head of the queue to a block designating a tail of the queue; reading, by each of a plurality of first sender processes, messages from one or more blocks in the queue beginning at the head of the queue; sending, by each of the plurality of first sender processes, the read messages to a respective recipient; designating as old one or more of the blocks having associated times that are earlier than a first time; designating a block associated with a time later than or equal to the first time as a new head of the queue; allowing one or more of the first sender processes to read messages from the old blocks until a second time which is later than the first time; and deleting from the queue one or more of the old blocks at a time later than or equal to the second time.

In certain examples, the operations also include determining that there are one or more messages to be read in the queue for one or more second sender processes and, based thereon, waking the second sender processes. Determining that there are one or more messages to be read in the queue for one or more second sender processes may include: for one or more publisher processes, determining if the publisher process has inserted a new message into the queue since a previous time; and identifying the second sender processes as processes that have not read one of the new messages from the queue. The one or more second processes may include at least one multiple queue publisher.

In some examples, the queue is for messages of a single channel, and each of the recipients has subscribed to the channel. The queue may be for messages from a single publisher. A particular recipient may be an MX node or a Q node. In some implementations, the operations include inserting, by one or more publisher processes, one or more messages into the block designating the tail of the queue. A particular publisher process may be an MX node, a Q node, or a multiple queue publisher.

The operations may also include putting one or more first sender processes that have no more messages to read in the queue to sleep. The queue may include or be a channel queue. The one or more first sender processes may include at least one subscriber or multiple queue consumer. In various examples, the queue is for messages from at least one of a publisher and a multiple queue publisher. Designating one or more of the blocks as old may be done during the reading.

In another aspect, the subject matter of this disclosure relates to a computer program product stored in one or more non-transitory storage media for controlling a processing mode of a data processing apparatus. The computer program product is executable by the data processing apparatus to cause the data processing apparatus to perform operations that include: providing a queue comprising an ordered plurality of storage blocks, each storage block storing one or more respective messages and being associated with a respective time, wherein the times increase from a block designating a head of the queue to a block designating a tail of the queue; reading, by each of a plurality of first sender processes, messages from one or more blocks in the queue beginning at the head of the queue; sending, by each of the plurality of first sender processes, the read messages to a respective recipient; designating as old one or more of the blocks having associated times that are earlier than a first time; designating a block associated with a time later than or equal to the first time as a new head of the queue; allowing one or more of the first sender processes to read messages from the old blocks until a second time which is later than the first time; and deleting from the queue one or more of the old blocks at a time later than or equal to the second time.

In certain examples, the operations also include determining that there are one or more messages to be read in the queue for one or more second sender processes and, based thereon, waking the second sender processes. Determining that there are one or more messages to be read in the queue for one or more second sender processes may include: for one or more publisher processes, determining if the publisher process has inserted a new message into the queue since a previous time; and identifying the second sender processes as processes that have not read one of the new messages from the queue. The one or more second processes may include at least one multiple queue publisher.

In some examples, the queue is for messages of a single channel, and each of the recipients has subscribed to the channel. The queue may be for messages from a single publisher. A particular recipient may be an MX node or a Q node. In some implementations, the operations include inserting, by one or more publisher processes, one or more messages into the block designating the tail of the queue. A particular publisher process may be an MX node, a Q node, or a multiple queue publisher.

The operations may also include putting one or more first sender processes that have no more messages to read in the queue to sleep. The queue may include or be a channel queue. The one or more first sender processes may include at least one subscriber or multiple queue consumer. In various examples, the queue is for messages from at least one of a publisher and a multiple queue publisher. Designating one or more of the blocks as old may be done during the reading.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1A:
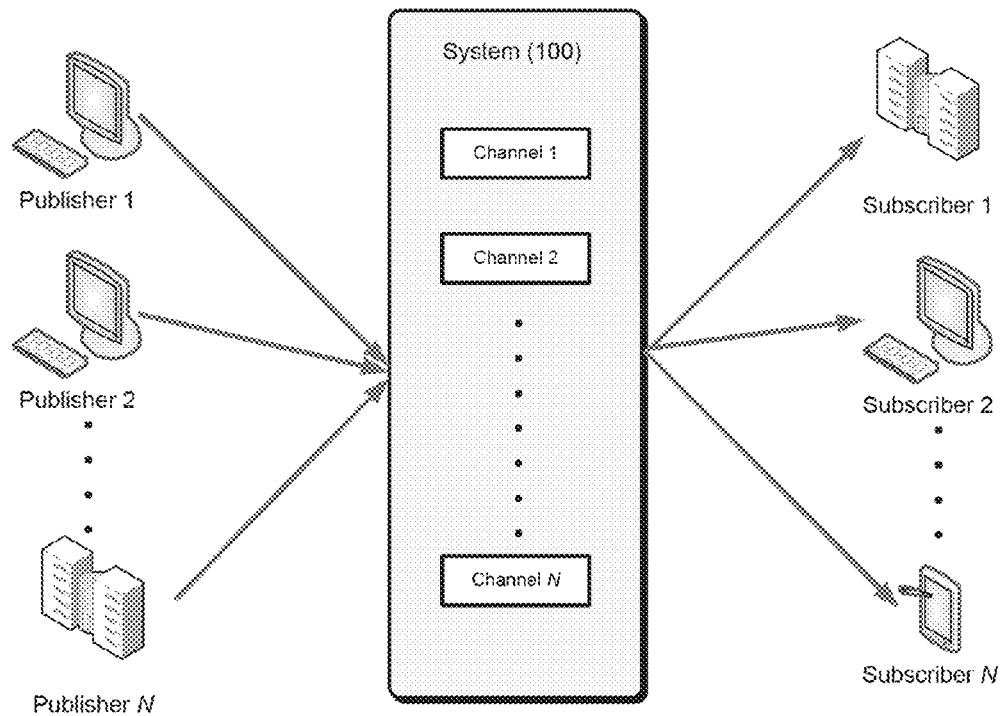
FIG. 1A illustrates an example system that supports the PubSub communication pattern.

FIG. 1A illustrates an example system 100 that supports the PubSub communication pattern. Publisher clients (e.g., Publisher 1) can publish messages to named channels (e.g., "Channel 1") by way of the system 100. A message can comprise any type of information including one or more of the following: text, image content, sound content, multimedia content, video content, binary data, and so on. Other types of message data are possible. Subscriber clients (e.g., Subscriber 2) can subscribe to a named channel using the system 100 and start receiving messages which occur after the subscription request or from a given position (e.g., a message number or time offset). A client can be both a publisher and a subscriber.

Depending on the configuration, a PubSub system can be categorized as follows:

One to One (1:1). In this configuration there is one publisher and one subscriber per channel. A typical use case is private messaging.

One to Many (1:N). In this configuration there is one publisher and multiple subscribers per channel. Typical use cases are broadcasting messages (e.g., stock prices).

Many to Many (M:N). In this configuration there are many publishers publishing to a single channel. The messages are then delivered to multiple subscribers. Typical use cases are map applications.

There is no separate operation needed to create a named channel. A channel is created implicitly when the channel is subscribed to or when a message is published to the channel. In some implementations, channel names can be qualified by a name space. A name space comprises one or more channel names. Different name spaces can have the same channel names without causing ambiguity. The name space name can be a prefix of a channel name where the name space and channel name are separated by a dot. In some implementations, name spaces can be used when specifying channel authorization settings. For instance, the messaging system 100 may have appl.foo and appl.system.notifications channels where "app 1" is the name of the name space. The system can allow clients to subscribe and publish to the appl.foo channel. However, clients can only subscribe to, but not publish to the appl.system.notifications channel.

Figure 1B:
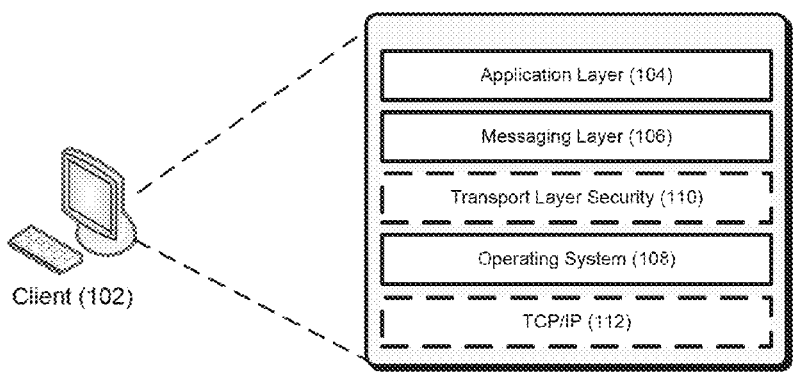
FIG. 1B illustrates functional layers of software on an example client device.

FIG. 1B illustrates functional layers of software on an example client device. A client device (e.g., client 102) is a data processing apparatus such as, for example, a personal computer, a laptop computer, a tablet computer, a smart phone, a smart watch, or a server computer. Other types of client devices are possible. The application layer 104 comprises the end-user application(s) that will integrate with the PubSub system 100. The messaging layer 106 is a programmatic interface for the application layer 104 to utilize services of the system 100 such as channel subscription, message publication, message retrieval, user authentication, and user authorization. In some implementations, the messages passed to and from the messaging layer 106 are encoded as JavaScript Object Notation (JSON) objects. Other message encoding schemes are possible.

The operating system 108 layer comprises the operating system software on the client 102. In various implementations, messages can be sent and received to/from the system 100 using persistent or non-persistent connections. Persistent connections can be created using, for example, network sockets. A transport protocol such as TCP/IP layer 112 implements the Transport Control Protocol/Internet Protocol communication with the system 100 that can be used by the messaging layer 106 to send messages over connections to the system 100. Other communication protocols are possible including, for example, User Datagram Protocol (UDP). In further implementations, an optional Transport Layer Security (TLS) layer 110 can be employed to ensure the confidentiality of the messages.

Figure 2:
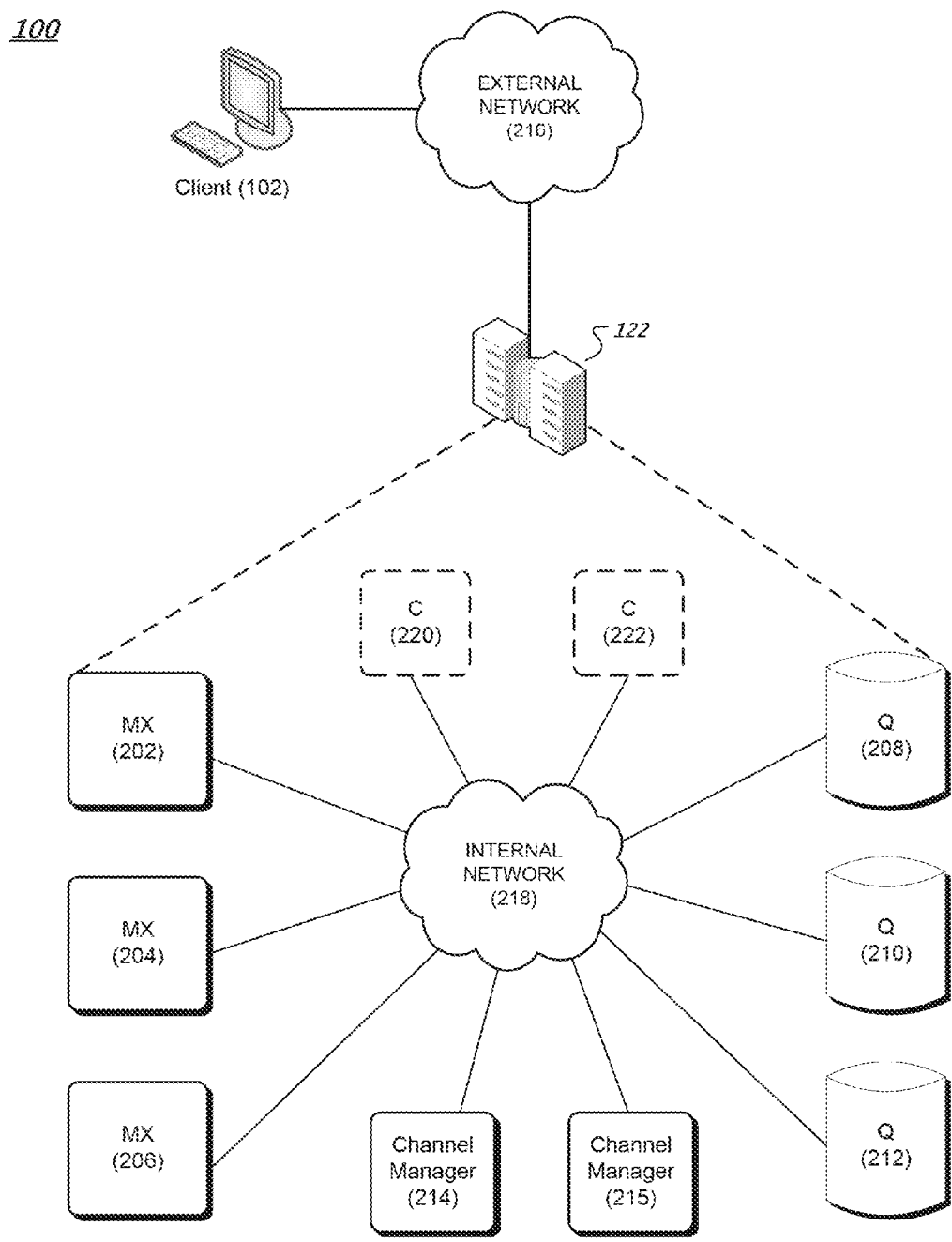
FIG. 2 is a diagram of an example messaging system.

FIG. 2 is a diagram of an example messaging system 100. The system 100 provides functionality for implementing PubSub communication patterns. The system comprises software components and storage that can be deployed at one or more data centers 122 in one or more geographic locations, for example. The system comprises MX nodes (e.g., MX nodes or multiplexer nodes 202, 204 and 206), Q nodes (e.g., Q nodes or queue nodes 208, 210 and 212), one or more channel manager nodes (e.g., channel managers 214, 215), and optionally one or more C nodes (e.g., C nodes or cache nodes 220 and 222). Each node can execute in a virtual machine or on a physical machine (e.g., a data processing apparatus). Each MX node serves as a termination point for one or more publisher and/or subscriber connections through the external network 216. The internal communication among MX nodes, Q nodes, C nodes, and the channel manager, is conducted over an internal network 218, for example. By way of illustration, MX node 204 can be the terminus of a subscriber connection from client 102. Each Q node buffers channel data for consumption by the MX nodes. An ordered sequence of messages published to a channel is a logical channel stream. For example, if three clients publish messages to a given channel, the combined messages published by the clients comprise a channel stream. Messages can be ordered in a channel stream by time of publication by the client, by time of receipt by an MX node, or by time of receipt by a Q node. Other ways for ordering messages in a channel stream are possible. In the case where more than one message would be assigned to the same position in the order, one of the messages can be chosen (e.g., randomly) to have a later sequence in the order. Each channel manager node is responsible for managing Q node load by splitting channel streams into so-called streamlets. Streamlets are discussed further below. The optional C nodes provide caching and load removal from the Q nodes.

In the example messaging system 100, one or more client devices (publishers and/or subscribers) establish respective persistent connections (e.g., TCP connections) to an MX node (e.g., MX 204). The MX node serves as a termination point for these connections. For instance, external messages (e.g., between respective client devices and the MX node) carried by these connections can be encoded based on an external protocol (e.g., JSON). The MX node terminates the external protocol and translates the external messages to internal communication, and vice versa. The MX nodes publish and subscribe to streamlets on behalf of clients. In this way, an MX node can multiplex and merge requests of client devices subscribing for or publishing to the same channel, thus representing multiple client devices as one, instead of one by one.

In the example messaging system 100, a Q node (e.g., Q node 208) can store one or more streamlets of one or more channel streams. A streamlet is a data buffer for a portion of a channel stream. A streamlet will close to writing when its storage is full. A streamlet will close to reading and writing and be de-allocated when its time-to-live (TTL) has expired. By way of illustration, a streamlet can have a maximum size of 1 MB and a TTL of three minutes. Different channels can have streamlets limited by different TTLs. For instance, streamlets in one channel can exist for up to three minutes, while streamlets in another channel can exist for up to 10 minutes. In various implementations, a streamlet corresponds to a computing process running on a Q node. The computing process can be terminated after the streamlet's TTL has expired, thus freeing up computing resources (for the streamlet) back to the Q node, for example.

When receiving a publish request from a client device, an MX node (e.g., MX 204) makes a request to a channel manager (e.g., channel manager 214) to grant access to a streamlet to write the message being published. Note, however, that if the MX node has already been granted write access to a streamlet for the channel (and the channel has not been closed to writing) the MX node can write the message to that streamlet without having to request a grant to access the streamlet. Once a message is written to a streamlet for a channel, the message can be read by MX nodes and provided to subscribers of that channel.

Similarly, when receiving a channel subscription request from a client device, an MX node makes a request to a channel manager to grant access to a streamlet for the channel to read messages from. If the MX node has already been granted read access to a streamlet for the channel (and the channel's TTL has not been closed to reading), the MX node can read messages from the streamlet without having to request a grant to access the streamlet. The read messages can then be forwarded to client devices that have subscribed to the channel. In various implementations, messages read from streamlets are cached by MX nodes so that MX nodes can reduce the number of times needed to read from the streamlets.

By way of illustration, an MX node can request a grant from the channel manager that allows the MX node to store a block of data into a streamlet on a particular Q node that stores streamlets of the particular channel. Example streamlet grant request and grant data structures are as follows:

```
StreamletGrantRequest = {
    "channel": string( )
    "mode": "read" | "write"
    "position": 0
}
StreamletGrant = {
    "streamlet-id": "abcdef82734987",
    "limit-size": 2000000, # 2 megabytes max
    "limit-msgs": 5000, # 5 thousand messages max
    "limit-life": 4000, # the grant is valid for 4 seconds
    "q-node": string( )
    "position": 0
}
```

The StreamletGrantRequest data structure stores the name of the stream channel and a mode indicating whether the MX node intends on reading from or writing to the streamlet. The MX node sends the StreamletGrantRequest to a channel manager node. The channel manager node, in response, sends the MX node a StreamletGrantResponse data structure. The StreamletGrantResponse contains an identifier of the streamlet (streamlet-id), the maximum size of the streamlet (limit-size), the maximum number of messages that the streamlet can store (limit-msgs), the TTL (limit-life), and an identifier of a Q node (q-node) on which the streamlet resides. The StreamletGrantRequest and StreamletGrantResponse can also have a position field that points to a position in a streamlet (or a position in a channel) for reading from the streamlet.

A grant becomes invalid once the streamlet has closed. For example, a streamlet is closed to reading and writing once the streamlet's TTL has expired and a streamlet is closed to writing when the streamlet's storage is full. When a grant becomes invalid, the MX node can request a new grant from the channel manager to read from or write to a streamlet. The new grant will reference a different streamlet and will refer to the same or a different Q node depending on where the new streamlet resides.

Figure 3A:
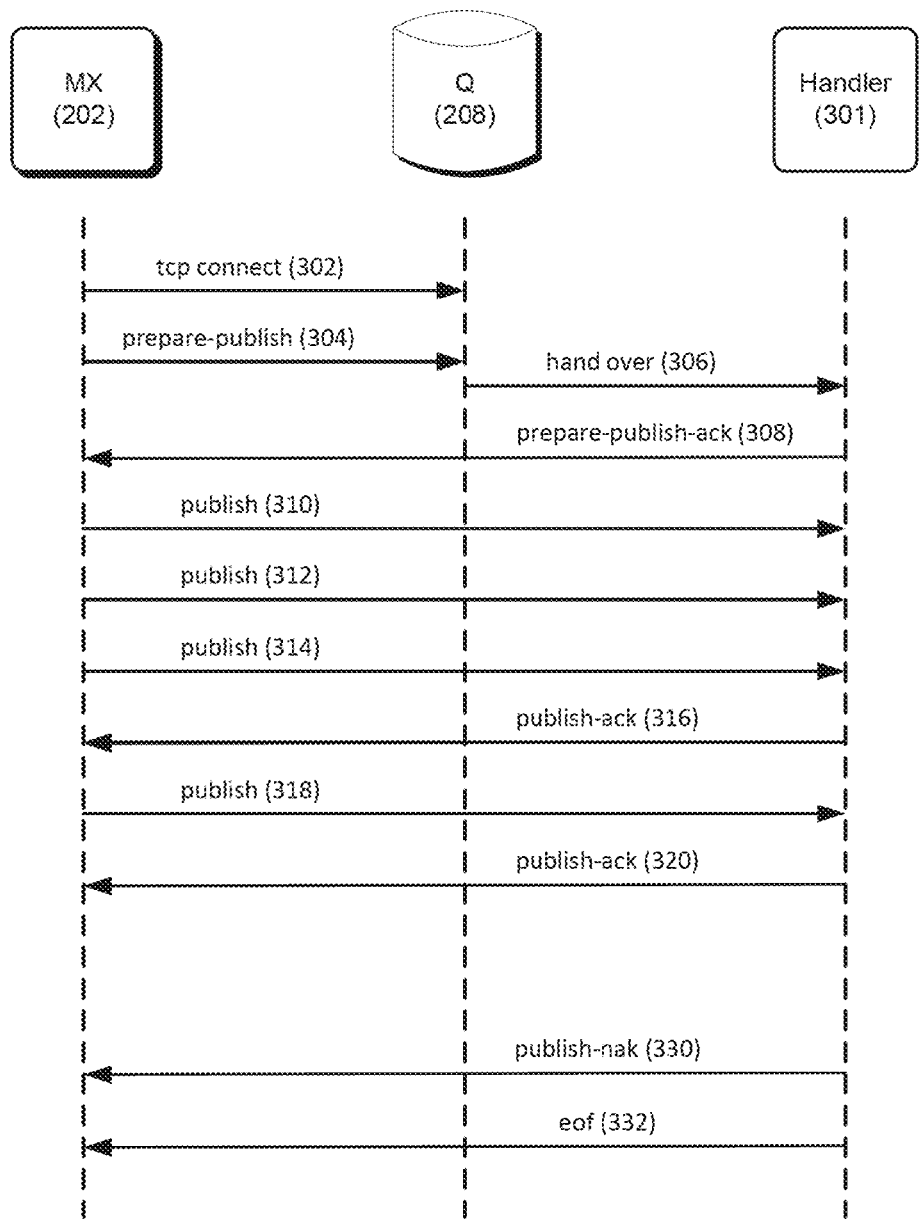
FIG. 3A is a data flow diagram of an example method for writing data to a streamlet.

FIG. 3A is a data flow diagram of an example method for writing data to a streamlet in various embodiments. In FIG. 3A, when an MX node (e.g., MX 202) request to write to a streamlet is granted by a channel manager (e.g., channel manager 214), as described before, the MX node establishes a Transmission Control Protocol (TCP) connection with the Q node identified in the grant response received from the channel manager (302). A streamlet can be written concurrently by multiple write grants (e.g., for messages published by multiple publisher clients). Other types of connection protocols between the MX node and the Q node are possible.

The MX node then sends a prepare-publish message with an identifier of a streamlet that the MX node wants to write to the Q node (304). The streamlet identifier and Q node identifier can be provided by the channel manager in the write grant as described earlier. The Q node hands over the message to a handler process 301 (e.g., a computing process running on the Q node) for the identified streamlet (306). The handler process can send to the MX node an acknowledgement (308). After receiving the acknowledgement, the MX node starts writing (publishing) messages (e.g., 310, 312, 314, and 318) to the handler process, which in turns stores the received data in the identified streamlet. The handler process can also send acknowledgements (316, 320) to the MX node for the received data. In some implementations, acknowledgements can be piggy-backed or cumulative. For instance, the handler process can send to the MX node an acknowledgement for every predetermined amount of data received (e.g., for every 100 messages received), or for every predetermined time period (e.g., for every one millisecond). Other acknowledgement scheduling algorithms such as Nagle's algorithm can be used.

If the streamlet can no longer accept published data (e.g., when the streamlet is full), the handler process sends a Negative-Acknowledgement (NAK) message (330) indicating a problem, following by an EOF (end-of-file) message (332). In this way, the handler process closes the association with the MX node for the publish grant. The MX node can then request a write grant for another streamlet from a channel manager if the MX node has additional messages to store.

Figure 3B:
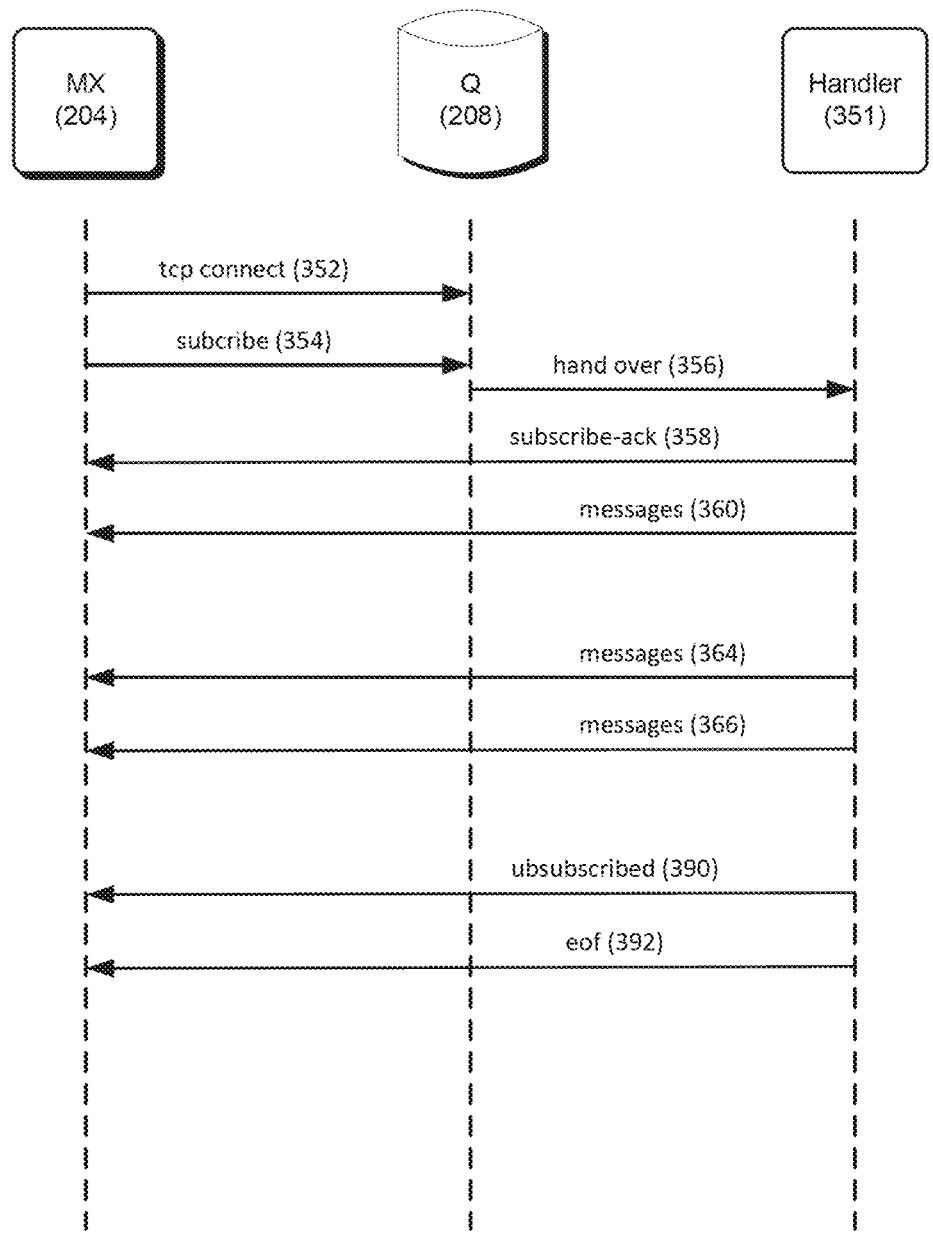
FIG. 3B is a data flow diagram of an example method for reading data from a streamlet.

FIG. 3B is a data flow diagram of an example method for reading data from a streamlet in various embodiments. In FIG. 3B, an MX node (e.g., MX 202) sends to a channel manager (e.g., channel manager 214) a request for reading a particular channel starting from a particular message or time offset in the channel. The channel manager returns to the MX node a read grant including an identifier of a streamlet containing the particular message, a position in the streamlet corresponding to the particular message, and an identifier of a Q node (e.g., Q node 208) containing the particular streamlet. The MX node then establishes a TCP connection with the Q node (352). Other types of connection protocols between the MX node and the Q node are possible.

The MX node then sends to the Q node a subscribe message with the identifier of the streamlet (in the Q node) and the position in the streamlet that the MX node wants to read from (356). The Q node hands over the subscribe message to a handler process 351 for the streamlet (356). The handler process can send to the MX node an acknowledgement (358). The handler process then sends messages (360, 364, 366), starting at the position in the streamlet, to the MX node. In some implementations, the handler process can send all of the messages in the streamlet to the MX node. After sending the last message in a particular streamlet, the handler process can send a notification of the last message to the MX node. The MX node can send to the channel manager another request for another streamlet containing a next message in the particular channel.

If the particular streamlet is closed (e.g., after its TTL has expired), the handler process can send an unsubscribe message (390), followed by an EOF message (392), to close the association with the MX node for the read grant. The MX node can close the association with the handler process when the MX node moves to another streamlet for messages in the particular channel (e.g., as instructed by the channel manager). The MX node can also close the association with the handler process if the MX node receives an unsubscribe message from a corresponding client device.

In various implementations, a streamlet can be written into and read from at the same time instance. For instance, there can be a valid read grant and a valid write grant at the same time instance. In various implementations, a streamlet can be read concurrently by multiple read grants (e.g., for channels subscribed to by multiple publisher clients). The handler process of the streamlet can order messages from concurrent write grants based on, e.g., time-of-arrival, and store the messages based on the order. In this way, messages published to a channel from multiple publisher clients can be serialized and stored in a streamlet of the channel.

In the messaging system 100, one or more C nodes (e.g., C node 220) can offload data transfers from one or more Q nodes. For instance, if there are many MX nodes requesting streamlets from Q nodes for a particular channel, the streamlets can be offloaded and cached in one or more C nodes. The MX nodes (e.g., as instructed by read grants from a channel manager) can read the streamlets from the C nodes instead.

As described above, messages for a channel in the messaging system 100 are ordered in a channel stream. A channel manager (e.g., channel manager 214) splits the channel stream into fixed-sized streamlets that each reside on a respective Q node. In this way, storing a channel stream can be shared among many Q nodes; each Q node stores a portion (one or more streamlets) of the channel stream. More particularly, a streamlet can be stored in registers and dynamic memory elements associated with a computing process on a Q node thus avoiding the need to access persistent, slower storage devices such as hard disks. This results in faster message access. The channel manager can also balance load among Q nodes in the messaging system 100 by monitoring respective workload of the Q nodes and allocating streamlets in a way that avoids overloading any one Q node.

In various implementations, a channel manager maintains a list identifying each active streamlet, the respective Q node on which the streamlet resides, and identification of the position of the first message in the streamlet, and whether the streamlet is closed for writing. In some implementations, Q nodes notify the channel manager and any MX nodes that are publishing to a streamlet the streamlet is closed due to being full or when the streamlet's TTL has expired. When a streamlet is closed the streamlet remains on the channel manager's list of active streamlets until the streamlet's TTL has expired so that MX nodes can continue to retrieve messages from the streamlet.

When an MX node requests a write grant for a given channel and there is not a streamlet for the channel that can be written to, the channel manager allocates a new streamlet on one of the Q nodes and returns the identity of the streamlet and the Q node in the StreamletGrant. Otherwise the channel manager returns the identity of the currently open for writing streamlet and corresponding Q node in the StreamletGrant. MX nodes can publish messages to the streamlet until the streamlet is full or the streamlet's TTL has expired, after which a new streamlet can be allocated by the channel manager.

When an MX node requests a read grant for a given channel and there is not a streamlet for the channel that can be read from, the channel manager allocates a new streamlet on one of the Q nodes and returns the identity of the streamlet and the Q node in the StreamletGrant. Otherwise, the channel manager returns the identity of the streamlet and Q node that contains the position from which the MX node wishes to read. The Q node can then begin sending messages to the MX node from the streamlet beginning at the specified position until there are no more messages in the streamlet to send. When a new message is published to a streamlet, MX nodes that have subscribed to that streamlet will receive the new message. If a streamlet's TTL has expired the handler 351 sends EOF message (392) to any MX nodes that are subscribed to the streamlet.

As described earlier in reference to FIG. 2, the messaging system 100 can include multiple channel managers (e.g., channel managers 214, 215). Multiple channel managers provide resiliency and prevent single point of failure. For instance, one channel manager can replicate lists of streamlets and current grants it maintains to another "slave" channel manager. As for another example, multiple channel managers can coordinate operations between them using distributed consensus protocols such as Paxos or Raft protocols.

Figure 4:
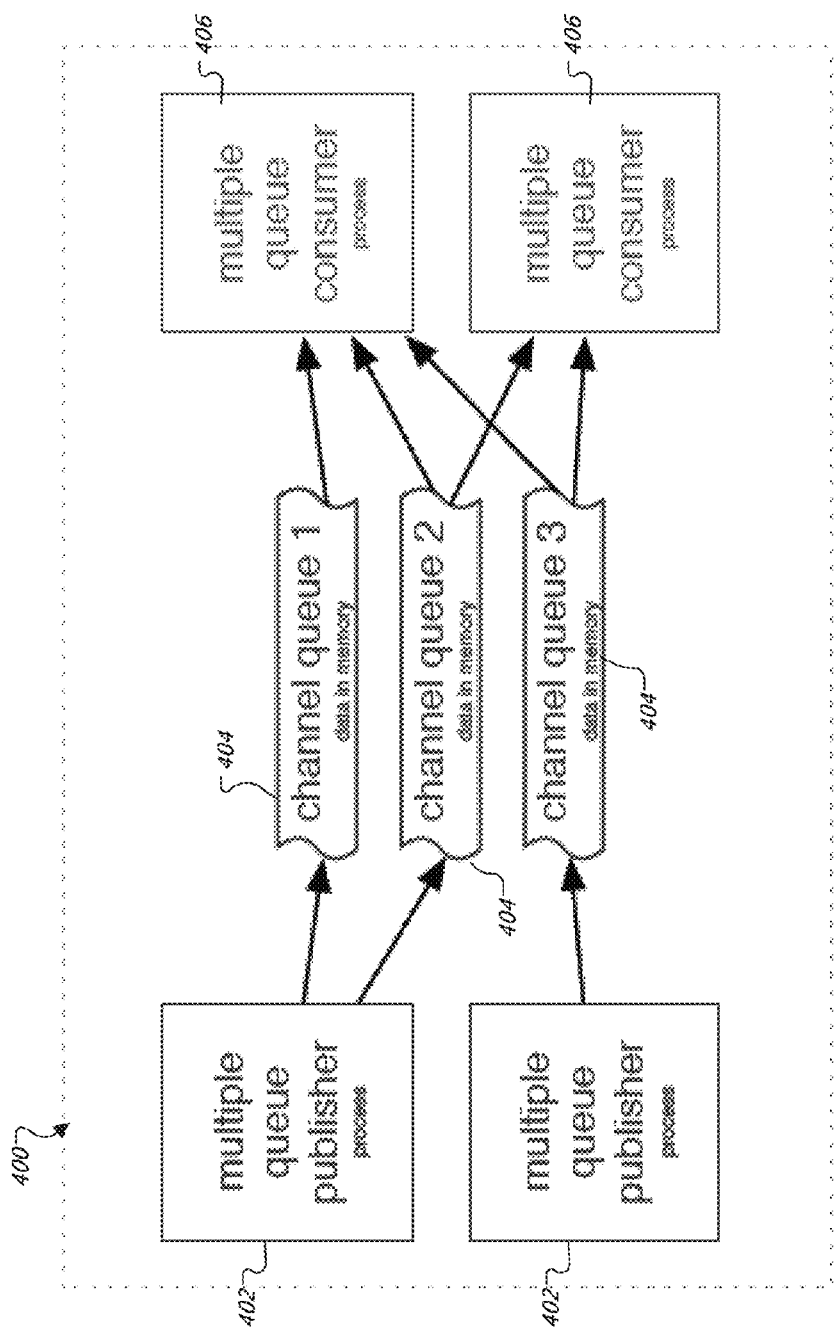
FIG. 4 is a schematic diagram of an example fast buffer system for handling message data.

Referring to FIG. 4, in certain implementations, the system 100 utilizes a fast buffer system 400 to receive, store, and deliver message data. The fast buffer system 400 includes a plurality of multiple queue publishers 402, a plurality of channel queues 404, and a plurality of multiple queue consumers 406. In general, the multiple queue publishers 402 receive messages (e.g., from one or more Q nodes or MX nodes) and provide the messages to the channel queues 404. Each multiple queue publisher 402 may provide messages to a single channel queue 404 or to more than one channel queue 404, as shown in FIG. 4. Each channel queue 404 is configured to receive messages from only one multiple queue publisher 402. Each queue publisher 402 and queue consumer 406 is a software component that comprises one or more threads of execution or processes.

In general, each channel queue 404 stores messages for a given channel in the system 100. The channel queues 404 keep track of the order in which messages are received from the multiple queue publishers 402. Each channel queue 404 includes or utilizes a memory device to store messages. A channel queue 404 may have its own memory device and/or may look up stored information in one or more other memory devices used by other system components, such as other channel queues 404 or Q nodes. A channel queue 404 uses memory pointers to look up stored information in a memory device.

The multiple queue consumers 406 retrieve messages from the channel queues 404 and deliver or publish the messages to downstream recipients (e.g., to one or more MX nodes or subscriber devices). For example, when a new message is received by a multiple queue publisher 402 and delivered to a channel queue 404, a multiple queue consumer 406 may retrieve the new message from the channel queue 404. Messages are always delivered from a channel queue 404 to a multiple queue consumer 406 in the order in which the messages were received by the multiple queue publisher 402.

In some instances, the multiple queue consumers 406 may be configured to sleep when no new messages are available to be retrieved. The multiple queue consumers 406 may be woken up (e.g., by a multiple queue publisher 402) when a new message is available. For example, a notifier component of a multiple queue publisher 402 may wake up a corresponding multiple queue consumer 406 when new message data arrives. Allowing the multiple queue consumers 406 to sleep when no messages are available for retrieval allows system resources to be better utilized. For example, processor time can be allocated to other system components and/or processes when the multiple queue consumers 406 are not needed and sleeping. As depicted in FIG. 4, a multiple queue consumer 406 can retrieve messages from a single channel queue 404 or from more than one channel queue 404. In preferred implementations, a multiple queue consumer 406 is configured to receive messages from multiple channel queues 404 at the same time.

Components of the fast buffer system 400 are preferably ephemeral and/or can be created and/or destroyed, as needed, according to a flow of message data into and out of the fast buffer system 400. In one example, when a new subscriber to a new channel is connected to an MX node, the MX node automatically creates a new multiple queue publisher 402 and a new channel queue 404 for receiving channel data from a Q node. When no additional message data is available for the new channel, the new multiple queue publisher 402 and/or the new channel queue 404 may be put to sleep, to allow system resources to be used elsewhere. In another example, a multiple queue publisher 402 and/or a multiple channel queue 404 (e.g., in an MX node) may be deleted when no associated multiple queue consumer 406 has existed or been active for more than a threshold period of time. To delete the multiple queue publisher 402, a process associated with the multiple queue publisher 402 may be terminated. Memory allocated to a deleted channel queue 404 may be reallocated to other channel queues 404 or other system components or freed, as needed.

In certain implementations, each multiple queue publisher 402 and/or multiple queue consumer 406 is associated with a unique process identifier (PID). The PIDs allow the system 100 to monitor the status of the multiple queue publishers 402, the channel queues 404, and the multiple queue consumers 406. The PIDs also allow the system 100 to adjust the priority of (or to terminate) one or more of the multiple queue publishers 402, the channel queues 404, and the multiple queue consumers 406, as needed. Alternatively or additionally, the PIDs may allow the system 100 to transfer or adopt a channel queue 404 from one publisher to another publisher.

In some examples, the system 100 uses a notification table to find components that are waiting for new data. For example, a multiple queue consumer can add itself to the notification table when it reaches the end of available data and wants to be notified when new data is added or becomes available for reading. When the new data becomes available, a notifier component can use the notification table to obtain the PIDs of multiple queue consumers that are waiting for the new data. The notifier component may then send notifications to inform the multiple queue consumers that the new data is available. Likewise, when a multiple queue publisher 402 adds message data to a multiple channel queue 404, a notifier component of the multiple queue publisher 402 may update the notification table to indicate the message data has been added to the multiple channel queue 404. In some examples, the channel queue 404 has or utilizes an additional per channel notification table where a multiple queue consumer 406 can add its PID before going to sleep, so that the multiple queue consumer 406 may be woken up when a new message is available for retrieval. In one implementation, if the notification table indicates a multiple queue consumer 406 is sleeping and subscribed to a channel where a new message is available for retrieval, a notifier (e.g., an auxiliary component of the multiple queue publisher 402) can wake up that multiple queue consumer 406. The notification table can then be updated to indicate the multiple queue consumer 406 is awake. When no new messages are available for the multiple queue consumer 406 to retrieve, the multiple queue consumer 406 can again be put to sleep, after its PID is added to the notification table.

Figure 5:
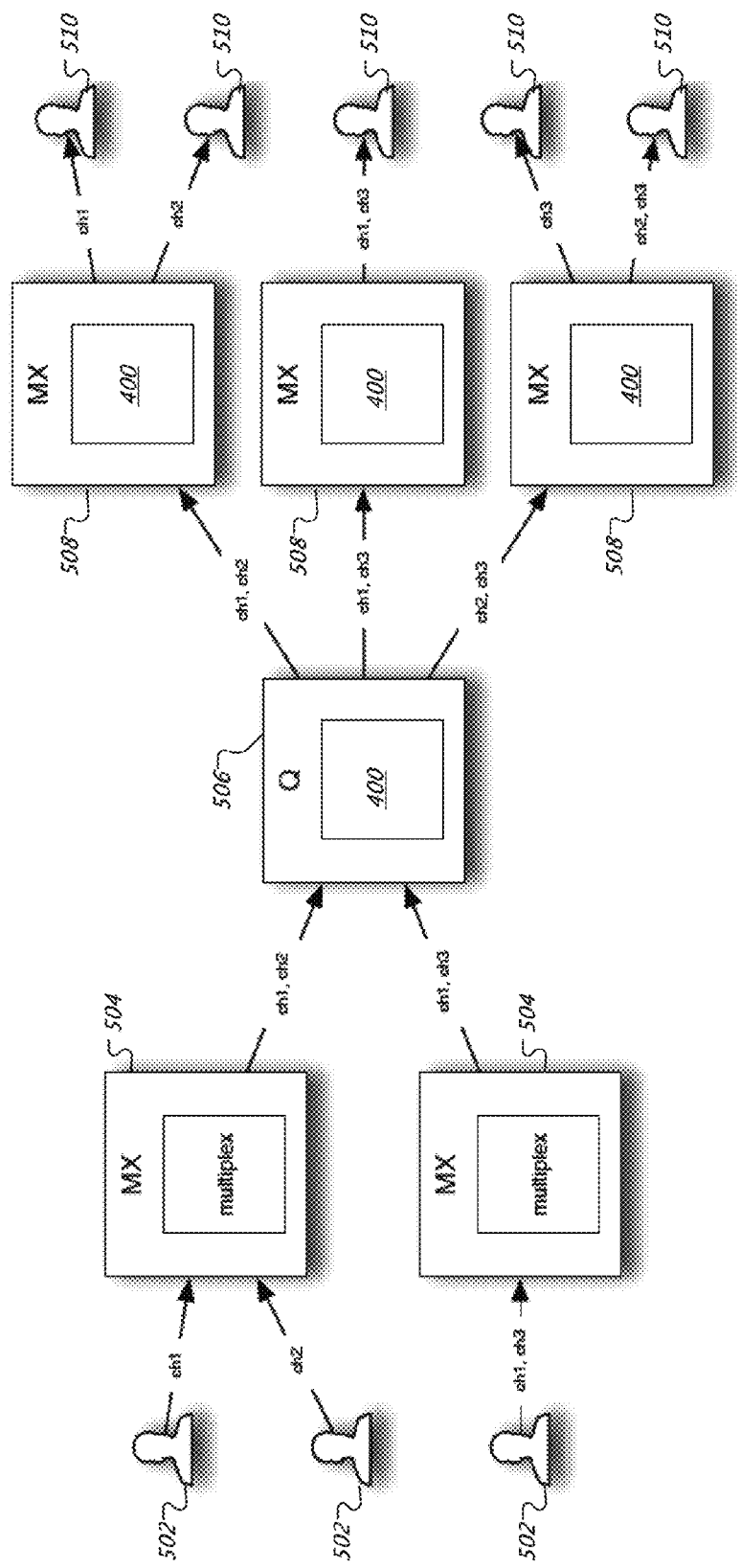
FIG. 5 is a schematic diagram of an example PubSub system that incorporates the fast buffer system of FIG. 4.

FIG. 5 shows an example PubSub system 500 in which the fast buffer system 400 is incorporated into Q nodes and/or MX nodes. Messages from publishers 502 are received by input MX nodes 504 which transfer the messages to a Q node 506 for storage. The messages are then retrieved from the Q node 506 by output MX nodes 508 which transfer the messages to subscribers 510. In the depicted example, a separate fast buffer system 400 is incorporated into the Q node 506 and the output MX nodes 508. The Q node 506 includes or utilizes its own fast buffer system 400 to receive messages from the input MX nodes 504, store the messages, and transmit the messages to the output MX nodes 508. Likewise, each output MX node 508 includes or utilizes its own fast buffer system 400 to receive messages from the Q node 506, store the messages, and transmit the messages to the subscribers 510. By storing the messages on the output MX nodes 508 for a limited time, the MX nodes 508 do not need to obtain the messages from other system components, thereby minimizing internal network traffic.

Advantageously, use of the fast buffer system 400 allows channel data to be copied only once. For example, when message data is received by the system 100 from a publisher, the message data can be stored or copied to a memory device. Preferably, the message data is copied only for data chunks that are less than a threshold number of bytes (e.g., 64 bytes); otherwise, the message data may not be copied and a reference to the message data may be created instead. All components of the fast buffer system 400 that require access to the message data may access the message data on the memory device, without making further copies. For example, fast buffer system components in a Q node or in an MX node can look up the message data on the memory device. A single copy of the message data is preferably accessible to all components of the fast buffer system 400 (e.g., within a single server), such that no further copying is required for the components to access the message data. To store and retrieve the message data, the system components may use pointers or other indicators that show where the message data is stored on the memory device. By copying channel data only once for all components of the fast buffer system 400, the fast buffer system 400 spends less time writing and removing channel data and devotes less memory space to storing the channel data. This enables system resources to be allocated to other activities, such as receiving messages from publishers and delivering the messages to subscribers efficiently and accurately.

Figure 6A:
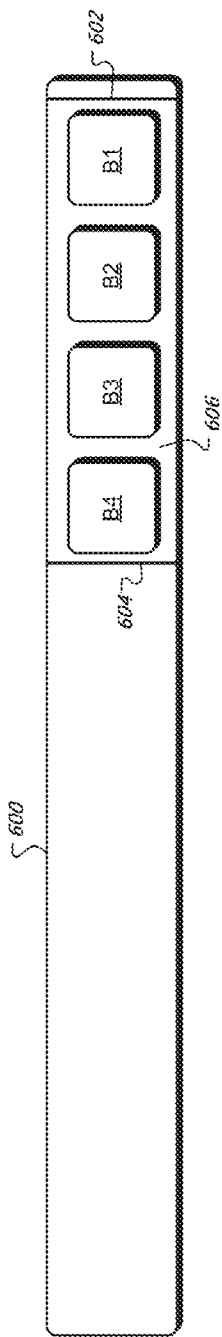
FIGS. 6A, 6B, and 6C are a schematic diagrams of an example queue for storing blocks of messages.

FIG. 6A is a schematic diagram of an example queue 600 used to store message data. The queue 600 may be the same as or similar to the channel queue 404, described herein. In the depicted example, the queue 600 is storing blocks B1, B2, B3, and B4, which each include one or more messages. The blocks were created by the queue 600 in the following order: B1, B2, B3, and B4. Accordingly, block B1 has been stored by the queue 600 the longest and defines a head of the queue 600, as indicated by a head boundary 602. Block B4 was added most recently to the queue 600 and defines a tail of the queue 600, as indicated by a tail boundary 604. The head boundary 602 and the tail boundary 604 define an active zone 606 for the queue 600. Within the active zone 606, blocks are accessible to system components and processes (e.g., sender processes associated with Q nodes and/or MX nodes). In general, these system components and processes access or read the blocks in an order in which the blocks were created by the queue 600 (i.e., from the head to the tail).

Each block in the queue 600 is associated with a time that the block arrived in the queue 600. Block B1, which arrived in the queue 600 first, is associated with an earlier time. Likewise, block B4, which arrived in the queue 600 last, is associated with a later time, which may be set by, for example, a Q node. A time for an MX node may be synchronized with a time for a Q node using, for example, a network time protocol (NTP) mechanism. In general, times associated with blocks in the queue 600 increase from the head of the queue 600 to the tail of the queue 600. Each of these times may be or may be based on, for example, a time of day or a counter that increments over time (e.g., with each second or portion thereof).

Figure 6B:
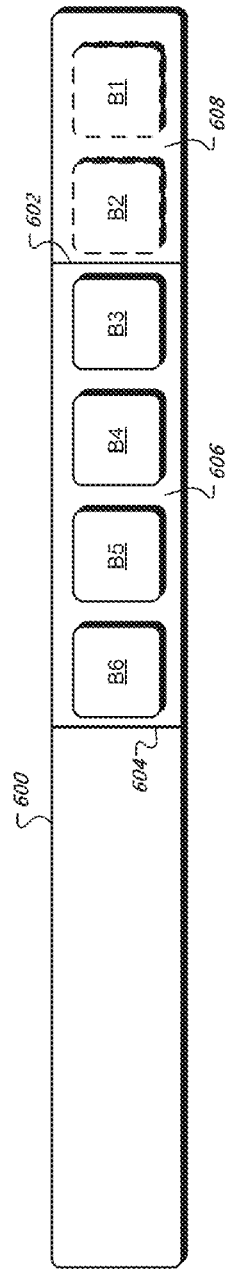

FIG. 6B shows the queue 600 at a later time when new blocks B5 and B6 have been added to the queue 600. Block B6, a most recent addition to the queue 600, now resides at the tail of the queue 600, as indicated by the tail boundary 604, which has been relocated to a new position after block B6. At this time, blocks B1 and B2 no longer reside in the active zone 606 and instead have been moved to an inactive zone 608 of the queue 600. The head boundary 602 is now located after block B2 and before block B3, which resides at the head of the queue 600. In general, each block is assigned a time-to-reside (TTR) in the active zone 606 of the queue 600. Once the TTR for a block has expired, the head boundary 602 is moved to indicate that the block now resides in the inactive zone 608. In the depicted example, the TTRs of blocks B1 and B2 have expired, and blocks B1 and B2 now reside in the inactive zone 608. Blocks in the inactive zone 608 are generally inaccessible to system components and processes. In some implementations, however, a process that was accessing a block in the active zone 606 may be given additional time to access the block after the TTR expires and the block has been moved to the inactive zone 608. This gives such processes (e.g., asynchronous processes) additional time to finish reading from the blocks, in case the processes were unable to complete the reading before the TTR expired.

Figure 6C:
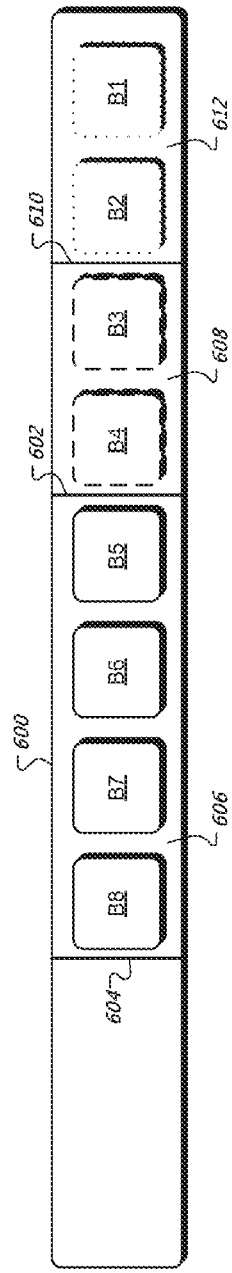

FIG. 6C shows the queue 600 at a later time when new blocks B7 and B8 have been added to the queue 600. Block B8, the most recent addition to the queue 600, now resides at the tail of the queue 600, as indicated by the tail boundary 604, which has been relocated to a new position after block B8. At this time, the TTRs of blocks B3 and B4 have expired, and blocks B3 and B4 have been moved from the active zone 606 to the inactive zone 608. The head boundary 602 is now located after block B4 and before block B5, which resides at the head of the queue 600. The head boundary 602 and an inactive zone boundary 610 define the inactive zone 608. Preceding the inactive zone boundary 610 is a dead zone 612, where blocks B1 and B2 are now located. In general, each block is assigned a time-to-live (TTL) after which the block is moved from the inactive zone 608 to the dead zone 612. After being moved to the dead zone 612, a block is considered to be dead and is no longer accessible to all system components or processes. This may free up system memory to store additional blocks and/or message data.

Given the progression of blocks from the active zone 606, to the inactive zone 608, and to the dead zone 612, the TTL of a block is greater than the TTR of a block. The TTR of a block is preferably long enough that system components and processes have sufficient time to access the block in the active zone 606, but not so long that memory is tied up storing blocks that no longer need to be accessed. The TTR may be, for example, about 1 second, about 10 seconds, about 30 seconds, or about 60 seconds. In preferred implementations, the TTR is about 30 seconds. The TTL of a block is generally longer than the TTR, to give the block time to reside in the inactive zone 608. This gives system components and processes (e.g., asynchronous processes) additional time to access the blocks before the blocks are deleted or no longer accessible. In one example, TTL=C*TTR, where C is a constant greater than or equal to one. For example, C may be about 1.1, about 1.2, or about 1.3. In a specific example, when TTR=30 seconds, and C=1.2, TTL=36 seconds.

In general, the queue 600 receives messages from a publisher (e.g., a multiple queue publisher 402, an MX node, or a Q node) for one or more channels. One or more sender processes (e.g., associated with subscribers, Q nodes, MX nodes, and/or multiple queue consumers 404) receive messages from the queue 600 and send the messages to other system components (e.g., to subscriber TCP/IP connections).

In various implementations, the queue 600 receives blocks of messages from only one publisher. The blocks are generated by the publisher in an order, and the blocks are received by the queue 600 in the same order. This makes it easier for system components and processes to know the order of blocks in the queue 600 and to access messages from the blocks. The publisher may be, for example, a client device of a user, an MX node, a Q node, and/or a multiple queue publisher. In general, all messages are maintained in an order and all client subscribers receive the messages in the same order.

In some examples, the queue 600 receives and stores messages only for a single channel. The messages may be received by the queue 600 from a single publisher or from multiple publishers, which may include, for example, a client device of a user, an MX node, a Q node, and/or a multiple queue publisher.

Figure 7:
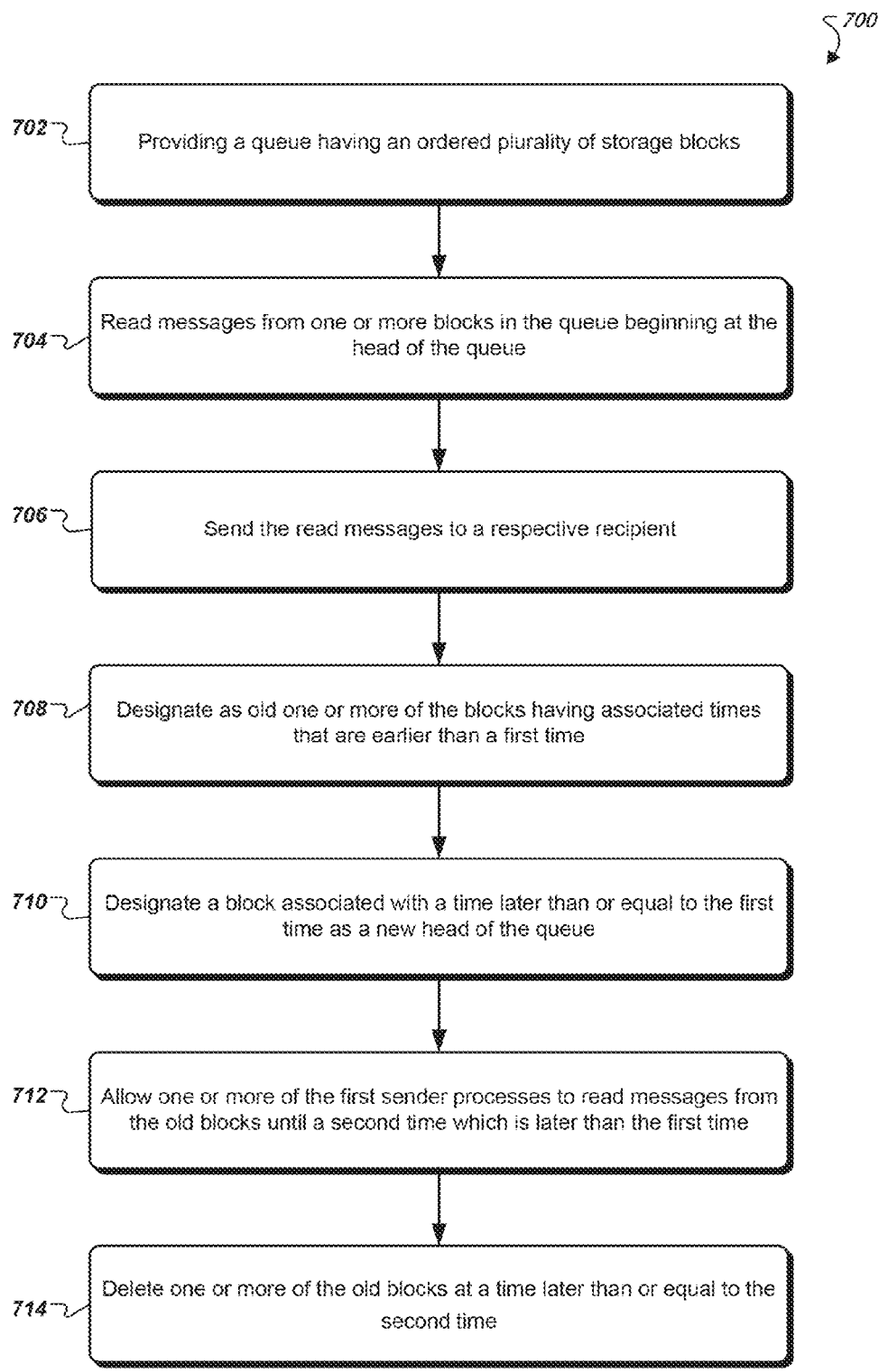
FIG. 7 is a flowchart of an example method of storing and accessing messages in a queue.

FIG. 7 is a flowchart of a method 700 of storing messages in a queue. The method 700 includes providing (step 702) a queue (e.g., queue 600 or channel queue 404) that includes an ordered plurality of storage blocks. Each storage block stores one or more respective messages and is associated with a respective time (e.g., a time at which the block was received by the queue). The times for the storage blocks increase (e.g., from earlier to later) from a block designating a head of the queue to a block designating a tail of the queue. Each of a plurality of first sender processes reads (step 704) messages from one or more blocks in the queue, beginning at the head of the queue and sends (step 706) the read messages to a respective recipient. One or more of the blocks having associated times that are earlier than a first time (e.g., based on the TTR) are designated (step 708) as old. A block associated with a time later than or equal to the first time is designated (step 710) as a new head of the queue. The designating step 708 and/or the designating step 710 may occur before, during, and/or after the reading step 704. One or more of the first sender processes that began reading messages from a block before the block was designated as old may be allowed to continue the reading operation (step 712) on the block until a second time (e.g., based on the TTL) which is later than the first time. This gives the first sender processes, which may be asynchronous, additional time to complete the reading operation. The reading operation is designed to complete much earlier than TTL timeouts (e.g., few orders of magnitude earlier). One or more of the old blocks are deleted (step 714) at a time later than or equal to the second time.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative, procedural, or functional languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a smart phone, a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
    performing by one or more computers:
        providing a queue comprising an ordered plurality of storage blocks, each storage block storing one or more respective messages and being associated with a respective time, wherein the times increase from a block designating a head of the queue to a block designating a tail of the queue;
        reading, by each of a plurality of first sender processes, messages from one or more blocks in the queue beginning at the head of the queue;
        sending, by each of the plurality of first sender processes, the read messages to a respective recipient;
        designating as old one or more of the blocks having associated times that are earlier than a first time;
        designating a block associated with a time later than or equal to the first time as a new head of the queue;
        allowing one or more of the first sender processes to read messages from the old blocks until a second time which is later than the first time; and
        deleting from the queue one or more of the old blocks at a time later than or equal to the second time.

2. The method of claim 1, further comprising:
    determining that there are one or more messages to be read in the queue for one or more second sender processes and, based thereon, waking the second sender processes.

3. The method of claim 2 wherein determining that there are one or more messages to be read in the queue for one or more second sender processes comprises:
    for one or more publisher processes, determining if the publisher process has inserted a new message into the queue since a previous time; and
    identifying the second sender processes as processes that have not read one of the new messages from the queue.

4. The method of claim 2 wherein the one or more second processes comprises at least one multiple queue publisher.

5. The method of claim 1 wherein the queue is for messages of a single channel and wherein each of the recipients has subscribed to the channel.

6. The method of claim 1 wherein the queue is for messages from a single publisher.

7. The method of claim 1 wherein a particular recipient is an MX node or a Q node.

8. The method of claim 1, further comprising:
    inserting, by one or more publisher processes, one or more messages into the block designating the tail of the queue.

9. The method of claim 8 wherein a particular publisher process is selected from the group consisting of an MX node, a Q node, and a multiple queue publisher.

10. The method of claim 1, further comprising putting one or more first sender processes that have no more messages to read in the queue to sleep.

11. The method of claim 1 wherein the queue comprises a channel queue.

12. The method of claim 1 wherein the one or more first sender processes comprise at least one subscriber or multiple queue consumer.

13. The method of claim 1 wherein the queue is for messages from at least one of a publisher and a multiple queue publisher.

14. The method of claim 1 wherein designating one or more of the blocks as old is done during the reading.

15. A system comprising:
    a non-transitory computer readable medium having instructions stored thereon; and
    a data processing apparatus configured to execute the instructions to perform operations comprising:
        providing a queue comprising an ordered plurality of storage blocks, each storage block storing one or more respective messages and being associated with a respective time, wherein the times increase from a block designating a head of the queue to a block designating a tail of the queue;
        reading, by each of a plurality of first sender processes, messages from one or more blocks in the queue beginning at the head of the queue;
        sending, by each of the plurality of first sender processes, the read messages to a respective recipient;
        designating as old one or more of the blocks having associated times that are earlier than a first time;
        designating a block associated with a time later than or equal to the first time as a new head of the queue;
        allowing one or more of the first sender processes to read messages from the old blocks until a second time which is later than the first time; and
        deleting from the queue one or more of the old blocks at a time later than or equal to the second time.

16. The system of claim 15, the operations further comprising:
  determining that there are one or more messages to be read in the queue for one or more second sender processes and, based thereon, waking the second sender processes.

17. The system of claim 16 wherein determining that there are one or more messages to be read in the queue for one or more second sender processes comprises:
  for one or more publisher processes, determining if the publisher process has inserted a new message into the queue since a previous time; and
  identifying the second sender processes as processes that have not read one of the new messages from the queue.

18. The system of claim 16 wherein the one or more second processes comprises at least one multiple queue publisher.

19. The system of claim 15 wherein the queue is for messages of a single channel and wherein each of the recipients has subscribed to the channel.

20. The system of claim 15 wherein the queue is for messages from a single publisher.

21. The system of claim 15 wherein a particular recipient is an MX node or a Q node.

22. The system of claim 15, the operations further comprising:
  inserting, by one or more publisher processes, one or more messages into the block designating the tail of the queue.

23. The system of claim 22 wherein a particular publisher process is selected from the group consisting of an MX node, a Q node, and a multiple queue publisher.

24. The system of claim 15, the operations further comprising putting one or more first sender processes that have no more messages to read in the queue to sleep.

25. The system of claim 15 wherein the queue comprises a channel queue.

26. The system of claim 15 wherein the one or more first sender processes comprise at least one subscriber or multiple queue consumer.

27. The system of claim 15 wherein the queue is for messages from at least one of a publisher and a multiple queue publisher.

28. The system of claim 15 wherein designating one or more of the blocks as old is done during the reading.

29. A computer program product stored in one or more non-transitory storage media for controlling a processing mode of a data processing apparatus, the computer program product being executable by the data processing apparatus to cause the data processing apparatus to perform operations comprising:
  providing a queue comprising an ordered plurality of storage blocks, each storage block storing one or more respective messages and being associated with a respective time, wherein the times increase from a block designating a head of the queue to a block designating a tail of the queue;
  reading, by each of a plurality of first sender processes, messages from one or more blocks in the queue beginning at the head of the queue;
  sending, by each of the plurality of first sender processes, the read messages to a respective recipient;
  designating as old one or more of the blocks having associated times that are earlier than a first time;
  designating a block associated with a time later than or equal to the first time as a new head of the queue;
  allowing one or more of the first sender processes to read messages from the old blocks until a second time which is later than the first time; and
  deleting from the queue one or more of the old blocks at a time later than or equal to the second time.

\* \* \* \* \*